United States Patent
Takahashi et al.

(10) Patent No.: US 10,367,223 B2
(45) Date of Patent: Jul. 30, 2019

(54) FUEL CELL STACK

(71) Applicant: HONDA MOTOR CO., LTD., Tokyo (JP)

(72) Inventors: Motohiro Takahashi, Wako (JP); Jun Kondo, Wako (JP); Hiromitsu Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 129 days.

(21) Appl. No.: 15/339,933

(22) Filed: Nov. 1, 2016

(65) Prior Publication Data

US 2017/0133702 A1 May 11, 2017

(30) Foreign Application Priority Data

Nov. 5, 2015 (JP) ................................ 2015-217267

(51) Int. Cl.
*H01M 8/2485* (2016.01)
*H01M 8/241* (2016.01)
(Continued)

(52) U.S. Cl.
CPC ......... *H01M 8/2485* (2013.01); *H01M 8/241* (2013.01); *H01M 8/2484* (2016.02);
(Continued)

(58) Field of Classification Search
CPC ....... H01M 2008/1095; H01M 8/1004; H01M 8/241; H01M 8/2475; H01M 8/2484; H01M 8/2485
See application file for complete search history.

(56) References Cited

U.S. PATENT DOCUMENTS 8,617,756 B2  12/2013  Kobayashi et al.

FOREIGN PATENT DOCUMENTS

| JP | 2006-236841 | 9/2006 |
| JP | 2009-224195 | 10/2009 |

(Continued)

OTHER PUBLICATIONS

Machine translation JP2006236841A. (Year: 2006).*
(Continued)

*Primary Examiner* — Jonathan G Leong
*Assistant Examiner* — Victoria H Lynch
(74) *Attorney, Agent, or Firm* — Mori & Ward, LLP

(57) ABSTRACT

A fuel cell stack includes power generation cells stacked in a stacking direction. Each of the power generation cells includes a membrane electrode assembly and a separator. The membrane electrode assembly includes an electrolyte membrane, and electrodes between which the electrolyte membrane is sandwiched in the stacking direction. The separator is stacked on the membrane electrode assembly in the stacking direction. The power generation cells are sandwiched between end plates in the stacking direction. A resin fluid manifold member is disposed on one of the end plates opposite to the power generation cells in the stacking direction and through which a fluid is to flow. The resin fluid manifold member has a contact surface which is in contact with the one of the end plates. The resin fluid manifold member includes recessed portions provided in the contact surface and ribs provided between the recessed portions in the contact surface.

11 Claims, 7 Drawing Sheets

(51) Int. Cl.
*H01M 8/2484* (2016.01)
*H01M 8/1004* (2016.01)
*H01M 8/2475* (2016.01)
*H01M 8/1018* (2016.01)

(52) U.S. Cl.
CPC ........ *H01M 8/1004* (2013.01); *H01M 8/2475* (2013.01); *H01M 2008/1095* (2013.01)

(56) References Cited

FOREIGN PATENT DOCUMENTS

| | | | | |
|---|---|---|---|---|
| JP | 2010055892 A | * | 3/2010 | .............. H01M 8/24 |
| JP | 2015-060716 | | 3/2015 | |

OTHER PUBLICATIONS

Machine translation JP2010055892A. (Year: 2010).*
Japanese Office Action for corresponding JP Application No. 2015-217267, dated Jul. 18, 2017 (w/ English machine translation).

* cited by examiner

FUEL CELL STACK

CROSS-REFERENCE TO RELATED APPLICATIONS

The present application claims priority under 35 U.S.C. § 119 to Japanese Patent Application No. 2015-217267, filed Nov. 5, 2015, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA), in which an anode electrode is disposed on one surface of an electrolyte membrane (solid polymer ion-exchange membrane) and a cathode electrode is disposed on the other surface of the electrolyte membrane. The MEA and a pair of separators, sandwiching the MEA, constitute a power generation cell (unit cell). Typically, a predetermined number of such power generation cells are stacked and used, for example, as a vehicle fuel cell stack, which is mounted in a fuel cell vehicle (fuel cell electric automobile or the like).

Fuel cell stacks include a fuel gas channel, an oxidant gas channel, and a coolant channel. The fuel gas channel, for supplying a fuel gas to the anode electrode, and the oxidant gas channel, for supplying an oxidant gas to the cathode electrode, are formed along surfaces of the separators. The coolant channel, through which a coolant flows, is formed between separators of adjacent power generation cells so as to extend along surfaces of the separators.

Some fuel cell stacks, which are called "internal manifold fuel cell stacks", further include a fuel gas manifold, through which a fuel gas flows; an oxidant gas manifold, through which an oxidant gas flows; and a coolant manifold, through which a coolant flows. These manifolds extend through the fuel cell stack in the stacking direction. The fuel gas manifold (fluid manifold) includes a fuel gas supply manifold and a fuel gas discharge manifold, and the oxidant gas manifold (fluid manifold) includes an oxidant gas supply manifold and an oxidant gas discharge manifold. The coolant manifold (fluid manifold) includes a coolant supply manifold and a coolant discharge manifold.

In the fuel cell stack, fluid manifold members, each of which is connected to a corresponding one of the fluid manifolds, is disposed on at least one of end plates. A fluid, which is a fuel gas, an oxidant gas, or a coolant, is supplied to or discharged from the fuel cell stack through the fluid manifold member. For example, Japanese Unexamined Patent Application Publication No. 2009-224195 describes a fuel cell stack in which a resin manifold member is disposed on one of end plates, and the resin manifold member has a reinforcement portion that is held by the one of the end plates.

Japanese Unexamined Patent Application Publication No. 2015-60716 describes a fuel cell stack in which a fluid manifold member has a rubber body. A rubber flange, which is integrally formed with the rubber body, is disposed at a joint portion where the rubber body is joined to an end plate. The rubber flange is pressed against and held by the end plate by using a metal bracket that is fixed to the end plate.

SUMMARY

According to one aspect of the present invention, a fuel cell stack includes a stack of power generation cells that are stacked, each of the power generation cells including a membrane electrode assembly in which electrodes are disposed on both sides of an electrolyte membrane, and a separator stacked on the membrane electrode assembly; end plates disposed at both ends of the stack of the power generation cells in a stacking direction; and a resin fluid manifold member that is disposed on one of the end plates and through which a fluid flows, the fluid being a coolant, a fuel gas, or an oxidant gas.

In the fuel cell stack, a plurality of recessed portions are formed, with ribs therebetween, in a contact surface of the resin fluid manifold member, the contact surface being in contact with the one of the end plates.

According to another aspect of the present invention, a fuel cell stack includes power generation cells, end plates, and a resin fluid manifold member. The power generation cells are stacked in a stacking direction. Each of the power generation cells includes a membrane electrode assembly and a separator. The membrane electrode assembly includes an electrolyte membrane, and electrodes between which the electrolyte membrane is sandwiched in the stacking direction. The separator is stacked on the membrane electrode assembly in the stacking direction. The power generation cells are sandwiched between the end plates in the stacking direction. The resin fluid manifold member is disposed on one of the end plates opposite to the power generation cells in the stacking direction and through which a fluid is to flow. The resin fluid manifold member has a contact surface which is in contact with the one of the end plates. The resin fluid manifold member includes recessed portions provided in the contact surface and ribs provided between the recessed portions in the contact surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
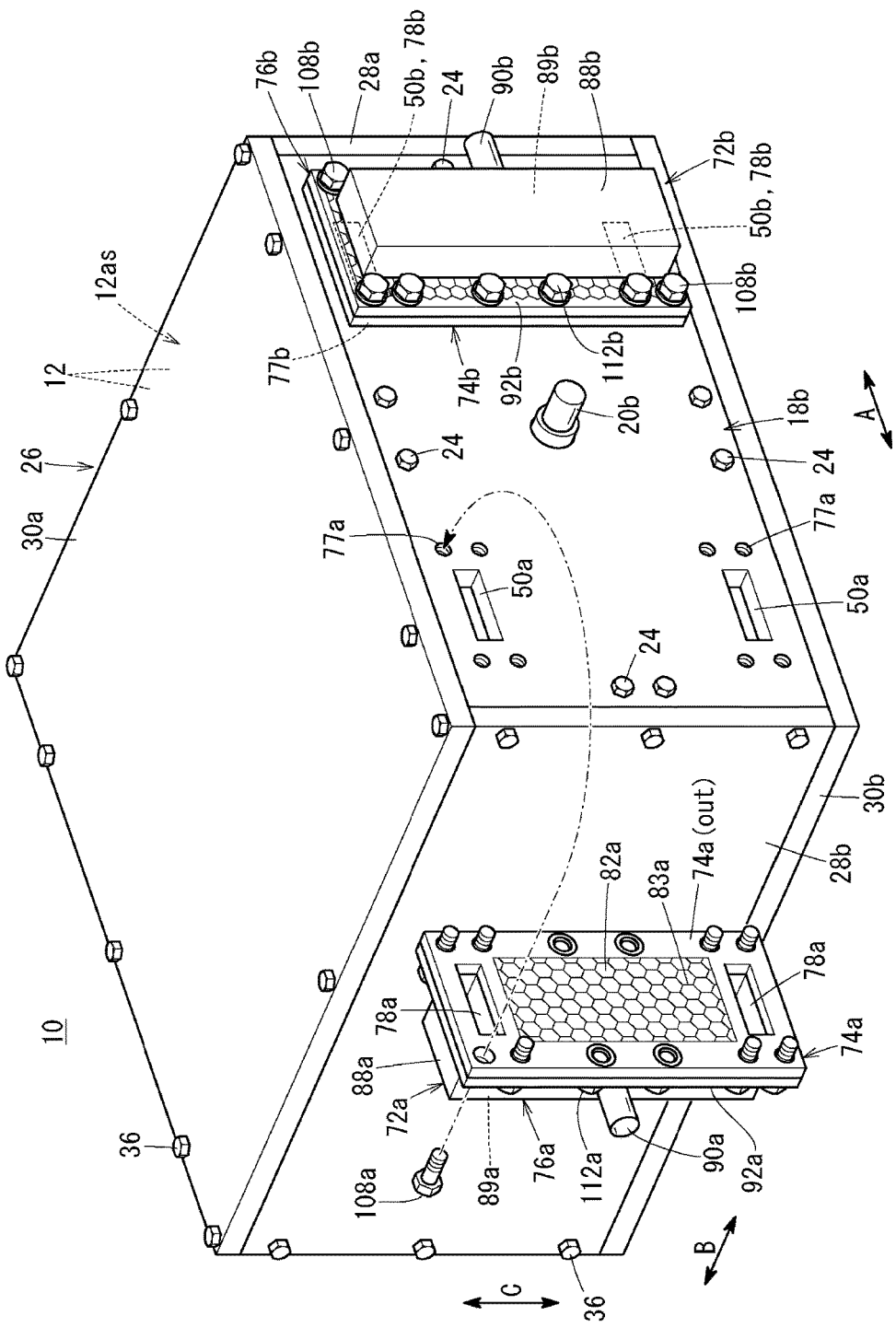
FIG. 1 is a perspective view of a fuel cell stack according an embodiment of the present disclosure, seen from the second end plate side.

The embodiments will now be described with reference to the accompanying drawings, wherein like reference numerals designate corresponding or identical elements throughout the various drawings.

Figure 2:
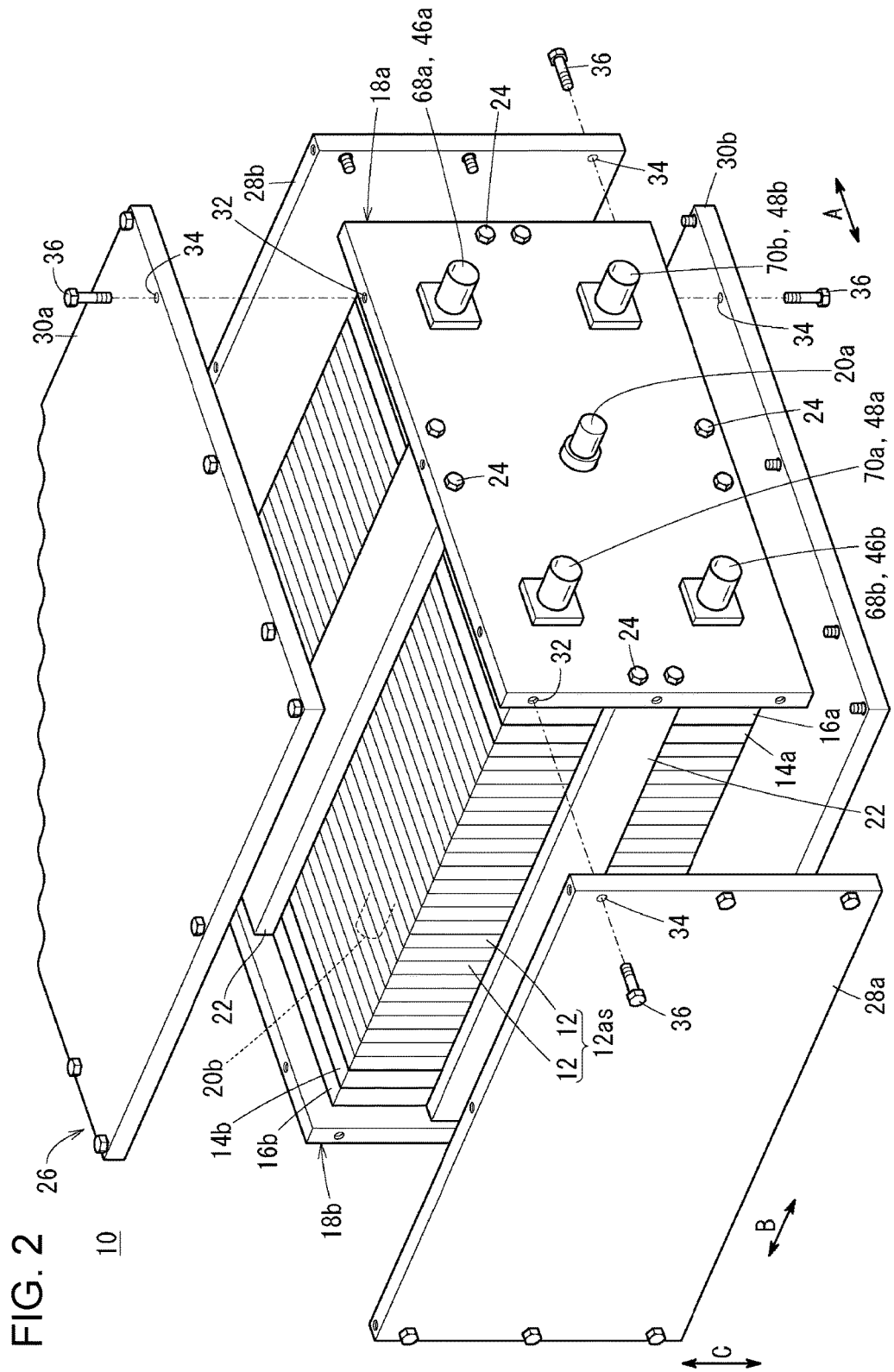
FIG. 2 is a partially exploded perspective view of the fuel cell, seen from the first end plate side.

Referring to FIGS. 1 and 2, a fuel cell stack 10 according to an embodiment of the present disclosure is mounted, for example, in a fuel cell electric automobile (not shown). The fuel cell stack 10 includes a stacked body 12*as*, in which a plurality of power generation cells 12 are stacked in a horizontal direction (direction of arrow B) so that electrode surfaces thereof are in an upright position (see FIG. 2). Alternatively, the power generation cells 12 may be stacked in the direction of gravity (direction of arrow C) in the fuel cell stack 10.

Referring to FIG. 2, at one end of the power generation cells 12 in the stacking direction (one end of the stacked body 12as), a first terminal plate 14a, a first insulation plate 16a, and a first end plate 18a are arranged outward. At the other end of the power generation cells 12 in the stacking direction (the other end of the stacked body 12as), a second terminal plate 14b, a second insulation plate 16b, and a second end plate 18b are arranged outward.

The first end plate 18a has a horizontally elongated (rectangular) shape. A first electric power output terminal 20a, which is connected to the first terminal plate 14a, extends outward from a substantially central part (which may be displaced from the center) of the first end plate 18a. The second end plate 18b has a horizontally elongated (rectangular) shape. A second electric power output terminal 20b, which is connected to the second terminal plate 14b, extends outward from a substantially central part (which may be displaced from the center) of the second end plate 18b.

Connection bars 22 are disposed between edge portions of the first end plate 18a and the second end plate 18b. Ends of the connection bars 22 are fixed to the first and second end plates 18a and 18b with screws 24 so as to apply a fastening load to the stack of power generation cells 12 in the stacking direction (direction of arrow B).

The fuel cell stack 10 includes a casing 26, as necessary. The first end plate 18a and the second end plate 18b form two sides (surfaces) of the casing 26 at both ends in the direction of arrow B. A first side panel 28a and a second side panel 28b, which have horizontally elongated plate-like shapes, form two sides (surfaces) of the casing 26 at both ends in the direction of arrow A. An upper side panel 30a and a lower side panel 30b form two sides (surfaces) of the casing 26 at both ends in the height direction (direction of arrow C). The upper side panel 30a and the lower side panel 30b have horizontally elongated plate-like shapes.

Referring to FIG. 2, tapped holes 32 are formed in the edge portions of the first end plate 18a and the second end plate 18b. Holes 34 are formed in the first side panel 28a, the second side panel 28b, the upper side panel 30a, and the lower side panel 30b at positions corresponding to those of the tapped holes 32. When screws 36 are inserted into the holes 34 and screwed into the tapped holes 32, the panels of the casing 26 are integrally fixed to each other.

Figure 3:
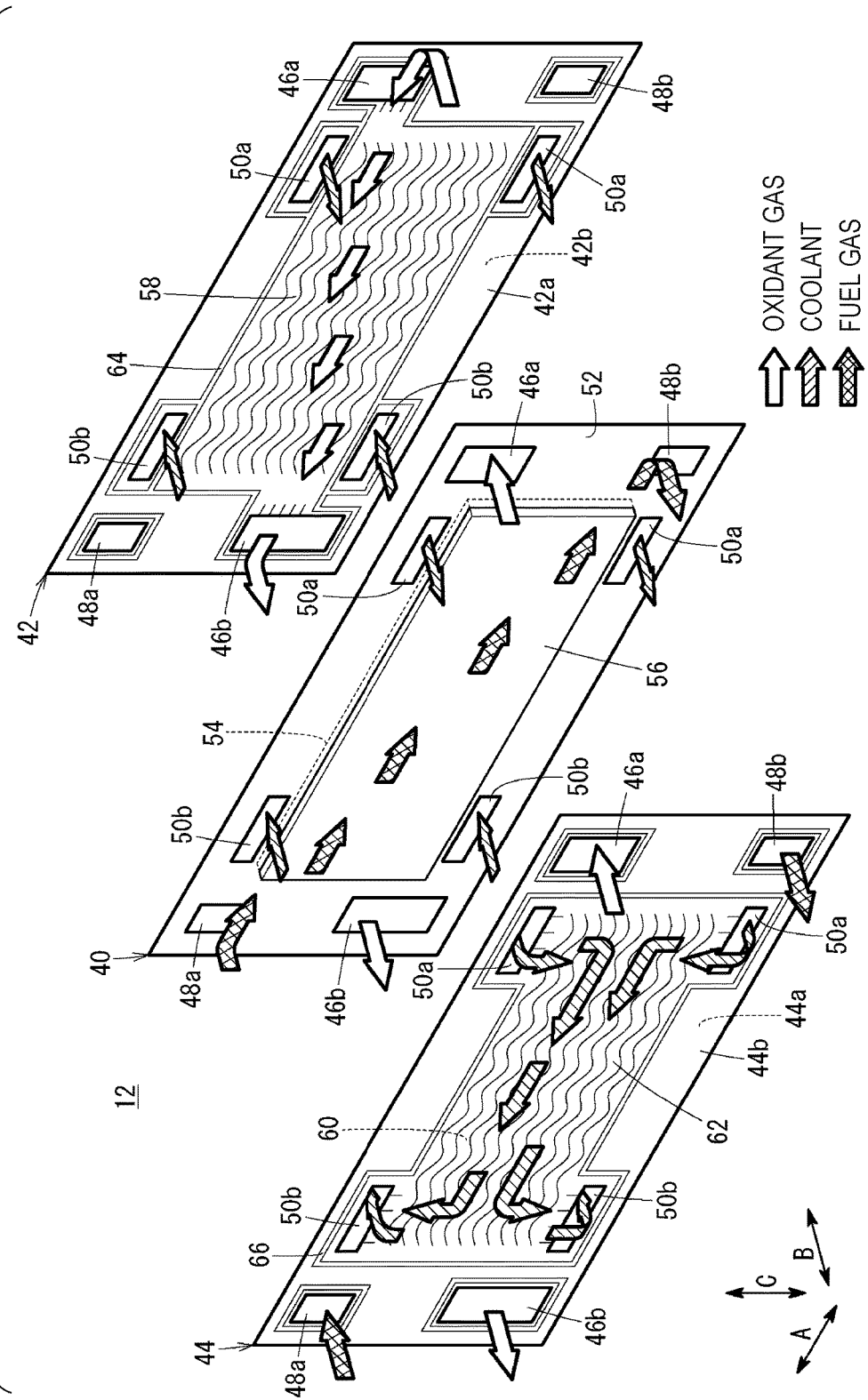
FIG. 3 is an exploded perspective view of a power generation cell included in the fuel cell stack.

Referring to FIG. 3, each of the power generation cells 12 includes a membrane electrode assembly 40, and a cathode separator 42 and a anode separator 44 sandwiching the membrane electrode assembly 40.

Each of the cathode separator 42 and the anode separator 44 is made from, for example, a steel plate, a stainless steel plate, an aluminum plate, a galvanized steel plate, or any of such metal plates whose surface is anticorrosive coated. Each of the cathode separator 42 and the anode separator 44, which is made by press-forming a thin metal plate, has a rectangular shape in plan view and an undulating shape in cross-sectional view. Instead of metal separators, for example, carbon separators may be used as the cathode separator 42 and the anode separator 44.

An oxidant gas supply manifold 46a and a fuel gas discharge manifold 48b are formed in the power generation cell 12 so as to extend in the direction of arrow B through one end portion of the power generation cell 12 in the longitudinal direction (direction of arrow A). An oxidant gas (fluid), such as an oxygen-containing gas, is supplied through the oxidant gas supply manifold 46a. A fuel gas (fluid), such as a hydrogen-containing gas, is discharged through the fuel gas discharge manifold 48b.

A fuel gas supply manifold 48a and an oxidant gas discharge manifold 46b are formed in the power generation cell 12 so as to extend in the direction of arrow B through the other end portion of the power generation cell 12 in the longitudinal direction. The fuel gas is supplied through the fuel gas supply manifold 48a. The oxidant gas is discharged through the oxidant gas discharge manifold 46b.

A pair of (or two pairs of) upper and lower coolant supply manifolds 50a are formed in the power generation cell 12 in end portions of the power generation cell 12 in the transversal direction (direction of arrow C) near the oxidant gas supply manifold 46a and the fuel gas discharge manifold 48b (near one end in the horizontal direction). The coolant supply manifolds 50a, through which a coolant (fluid) is supplied, are formed in opposing upper and lower end portions of the power generation cell 12 so as to extend in the direction of arrow B.

A pair of (or two pairs of) upper and lower coolant discharge manifolds 50b are formed in the power generation cell 12 in end portions of the power generation cell 12 in the transversal direction near the fuel gas supply manifold 48a and the oxidant gas discharge manifold 46b (near the other end in the horizontal direction). The coolant discharge manifolds 50b, through which a coolant is discharged, are formed in opposing upper and lower end portions of the power generation cell 12 so as to extend in the direction of arrow B.

The membrane electrode assembly 40 includes a solid polymer electrolyte membrane 52, and a cathode electrode 54 and an anode electrode 56 sandwiching the solid polymer electrolyte membrane 52. The solid polymer electrolyte membrane 52 is, for example, a thin film that is made of a perfluorosulfonic acid polymer and soaked with water.

The cathode electrode 54 and the anode electrode 56 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed on both sides of the solid polymer electrolyte membrane 52.

An oxidant gas channel 58, through which the oxidant gas supply manifold 46a is connected to the oxidant gas discharge manifold 46b, is formed on a surface 42a of the cathode separator 42 facing the membrane electrode assembly 40. The oxidant gas channel 58 includes a plurality of wave-shaped channel grooves (or linear channel grooves) extending in the direction of arrow A.

A fuel gas channel 60, through which the fuel gas supply manifold 48a is connected to the fuel gas discharge manifold 48b, is formed on a surface 44a of the anode separator 44 facing the membrane electrode assembly 40. The fuel gas channel 60 includes a plurality of wave-shaped channel grooves (or linear channel grooves) extending in the direction of arrow A.

A coolant channel 62, through which the coolant supply manifolds 50a are connected to the coolant discharge manifolds 50b, is formed between a surface 44b of the anode separator 44 of the power generation cell 12 and a surface 42b of the cathode separator 42 of an adjacent power generation cell 12. The coolant channel 62 extends in the horizontal direction and allows the coolant to flow through a region corresponding to the electrodes of the membrane electrode assembly 40.

A first sealing member 64 is integrally formed on the surfaces 42a and 42b of the cathode separator 42 so as to surround the outer periphery of the cathode separator 42. A second sealing member 66 is integrally formed on the surfaces 44a and 44b of the anode separator 44 so as to surround the outer periphery of the anode separator 44.

Each of the first sealing member 64 and the second sealing member 66 is made of an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

Referring to FIG. 2, an oxidant gas inlet manifold member 68a, an oxidant gas outlet manifold member 68b, a fuel gas inlet manifold member 70a, and a fuel gas outlet manifold member 70b are attached to the first end plate 18a. The oxidant gas inlet manifold member 68a, the oxidant gas outlet manifold member 68b, the fuel gas inlet manifold member 70a, and the fuel gas outlet manifold member 70b are each made of an electrically insulating resin.

The oxidant gas inlet manifold member 68a and the oxidant gas outlet manifold member 68b are respectively connected to the oxidant gas supply manifold 46a and the oxidant gas discharge manifold 46b. The fuel gas inlet manifold member 70a and the fuel gas outlet manifold member 70b are respectively connected to the fuel gas supply manifold 48a and the fuel gas discharge manifold 48b.

Referring to FIG. 1, a coolant inlet manifold member 72a (resin fluid manifold member), which is made of a resin, is attached to the second end plate 18b (one of the end plates). A coolant inlet manifold member 72a is connected to the pair of upper and lower coolant supply manifolds 50a. A coolant outlet manifold member 72b (resin fluid manifold member), which is made of a resin, is attached to the second end plate 18b. A coolant outlet manifold member 72b is connected to the pair of upper and lower coolant discharge manifolds 50b. Preferably, the coolant inlet manifold member 72a and the coolant outlet manifold member 72b are electrically insulating.

Figure 4:
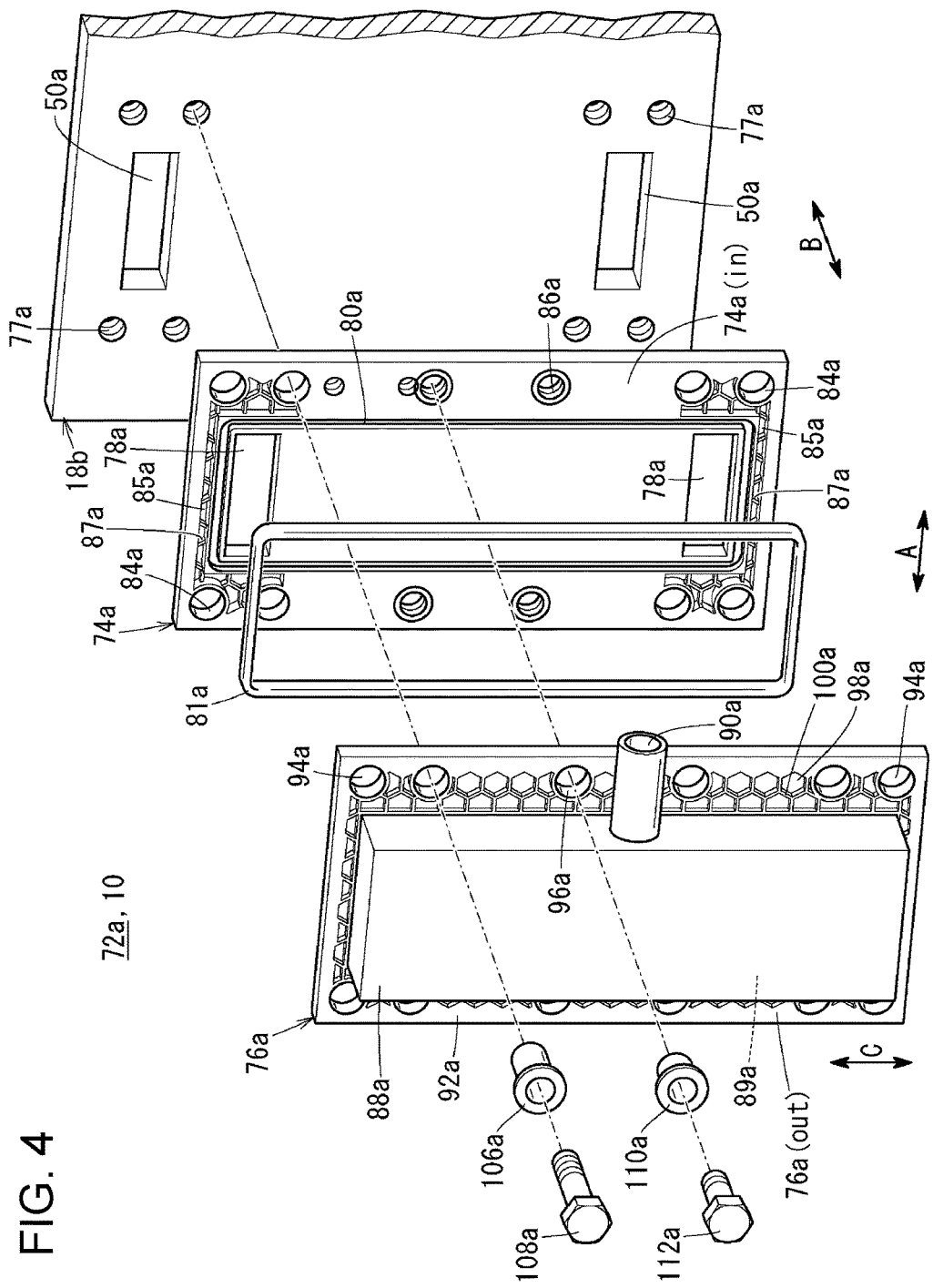
FIG. 4 is an exploded perspective view of a coolant supply manifold member of the fuel cell stack.

Referring to FIGS. 1 and 4, the coolant inlet manifold member 72a includes a manifold base 74a, which is in contact with the second end plate 18b. The manifold base 74a is fixed to a manifold cover 76a, and the manifold cover 76a is attached to the second end plate 18b. Four tapped holes 77a are formed in the second end plate 18b at positions near each of the coolant supply manifold 50a. Four tapped holes 77b are formed in the second end plate 18b at positions near each of the coolant discharge manifold 50b (see FIG. 1).

The manifold base 74a has a substantially flat plate-like shape. Coolant inlets 78a (fluid manifolds), which are fluidly connected with the coolant supply manifolds 50a, are formed in upper and lower parts of the manifold base 74a. A surrounding groove 80a, which surrounds the upper and lower coolant inlets 78a, is formed in a surface 74a(in) of the manifold base 74a facing the manifold cover 76a. A sealing member 81a is disposed in the surrounding groove 80a.

Figure 5:
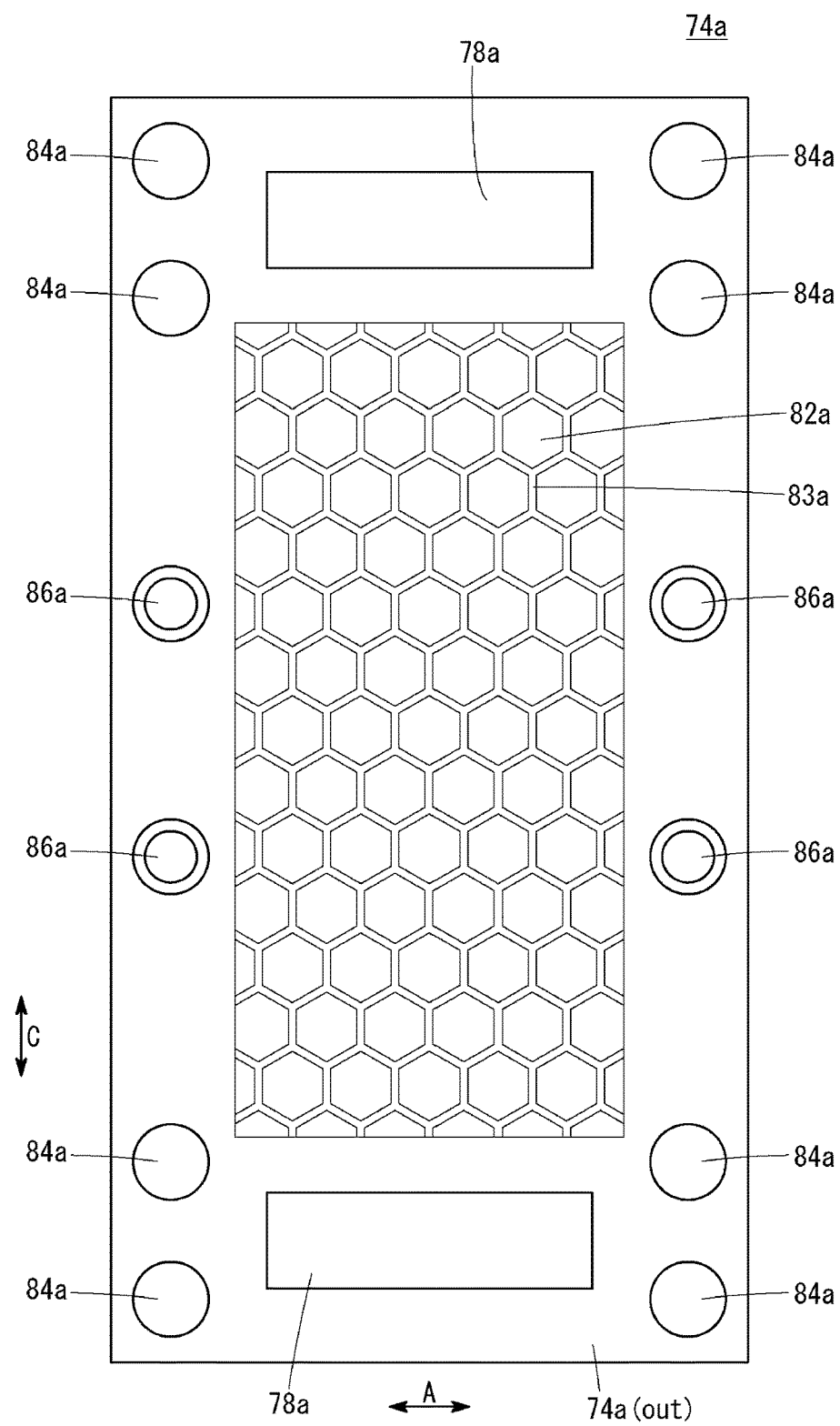
FIG. 5 is a plan view of a manifold base of the coolant supply manifold member.

Referring to FIGS. 1 and 5, a plurality of recessed portions 82a are formed, with ribs 83a therebetween, in a surface 74a(out) of the manifold base 74a, which is in contact with the second end plate 18b, so as to be located in a region between the pair of coolant inlets 78a. The height of the ribs 83a is smaller than that of the surface 74a(out) of the manifold base 74a. That is, the ribs 83a are separated inward from the surface 74a(out), and a space is formed between the ribs 83a and a surface of the second end plate 18b.

The recessed portions 82a have, for example, a honeycomb shape. The recessed portions 82a are separated from each other by the ribs 83a, each having a regular hexagonal shape. The depth h of the recessed portions 82a is set so that h/t is in the range of about 0.1 to 0.7, where t is the thickness of the manifold base 74a. Instead of the honeycomb shape, the recessed portions 82a may have, for example, polygonal shapes, such as triangular shapes or quadrangular shapes, or circular shapes.

Referring to FIG. 4, a plurality of recessed portions 85a are formed, with ribs 87a therebetween, in regions of the surface 74a(in) of the manifold base 74a around the coolant inlets 78a. The height of the ribs 87a is smaller than that of the surface 74a(in) of the manifold base 74a. That is, the ribs 87a are separated inward from the surface 74a(in), and a space is formed between the ribs 87a and a surface of the manifold cover 76a. The depth h of the recessed portions 85a is set so that h/t is in the range of about 0.1 to 0.7, where t is the thickness of the manifold base 74a. Instead of the honeycomb shape, the recessed portions 85a may have, for example, polygonal shapes, such as triangular shapes or quadrangular shapes, or circular shapes.

A pair of (upper and lower) holes 84a are formed at each of two upper corners of the manifold base 74a. A pair of (upper and lower) holes 84a are formed at each of two lower corners of the manifold base 74a. The holes 84a are arranged so as to be coaxial with the tapped holes 77a of the second end plate 18b. A pair of (upper and lower) metal female-threaded members 86a are embedded in substantially the central part of the manifold base 74a in the height direction (direction of arrow C) so as to be located in each of end portions of the manifold base 74a in the direction of arrow A.

Figure 6:
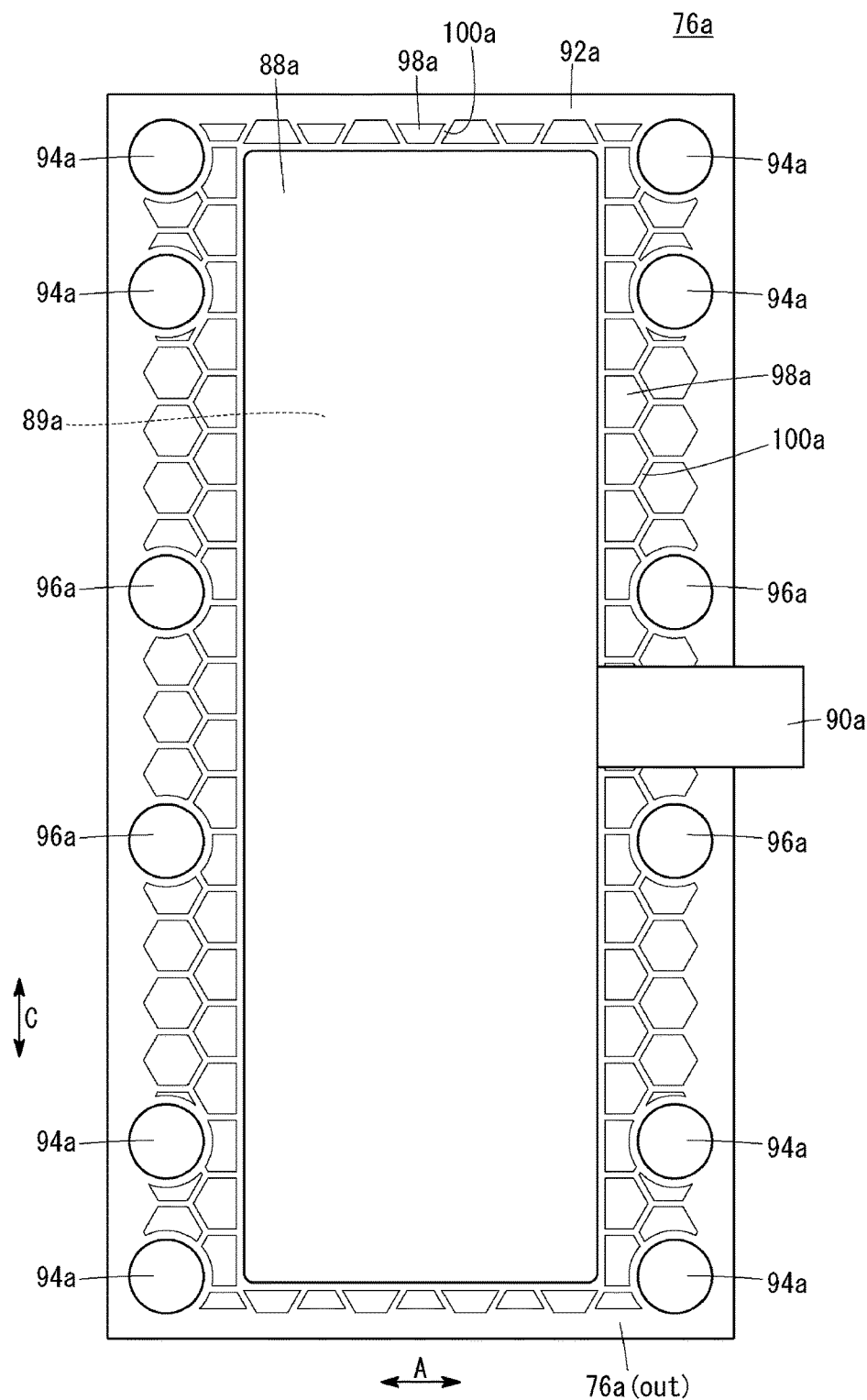
FIG. 6 is a plan view illustrating an outer surface of a manifold cover of the coolant supply manifold member.

Referring to FIGS. 4 and 6, the manifold cover 76a includes a box-shaped body 88a that forms a coolant passage 89a that is connected to the upper and lower coolant inlets 78a of the manifold base 74a. An inlet pipe 90a, to which the coolant is supplied, is disposed at substantially the central part of the body 88a in the height direction so as to extend in a horizontal direction (or in a direction that is inclined with respect to the horizontal direction). A flange 92a is disposed around the outer periphery of the body 88a.

Referring to FIG. 4, a pair of (upper and lower) holes 94a are formed at each of two upper corners of the flange 92a. A pair of (upper and lower) holes 94a are formed at each of two lower corners of the flange 92a. A pair of (upper and lower) holes 96a are formed in substantially the central part of the flange 92a in the height direction (direction of arrow C) so as to be located in each of end portions of the flange 92a in the direction of arrow A.

The holes 94a of the flange 92a are arranged so as to be coaxial with the holes 84a of the manifold base 74a. The holes 96a of the flange 92a are arranged so as to be coaxial with the metal female-threaded members 86a of the manifold base 74a.

Figure 7:
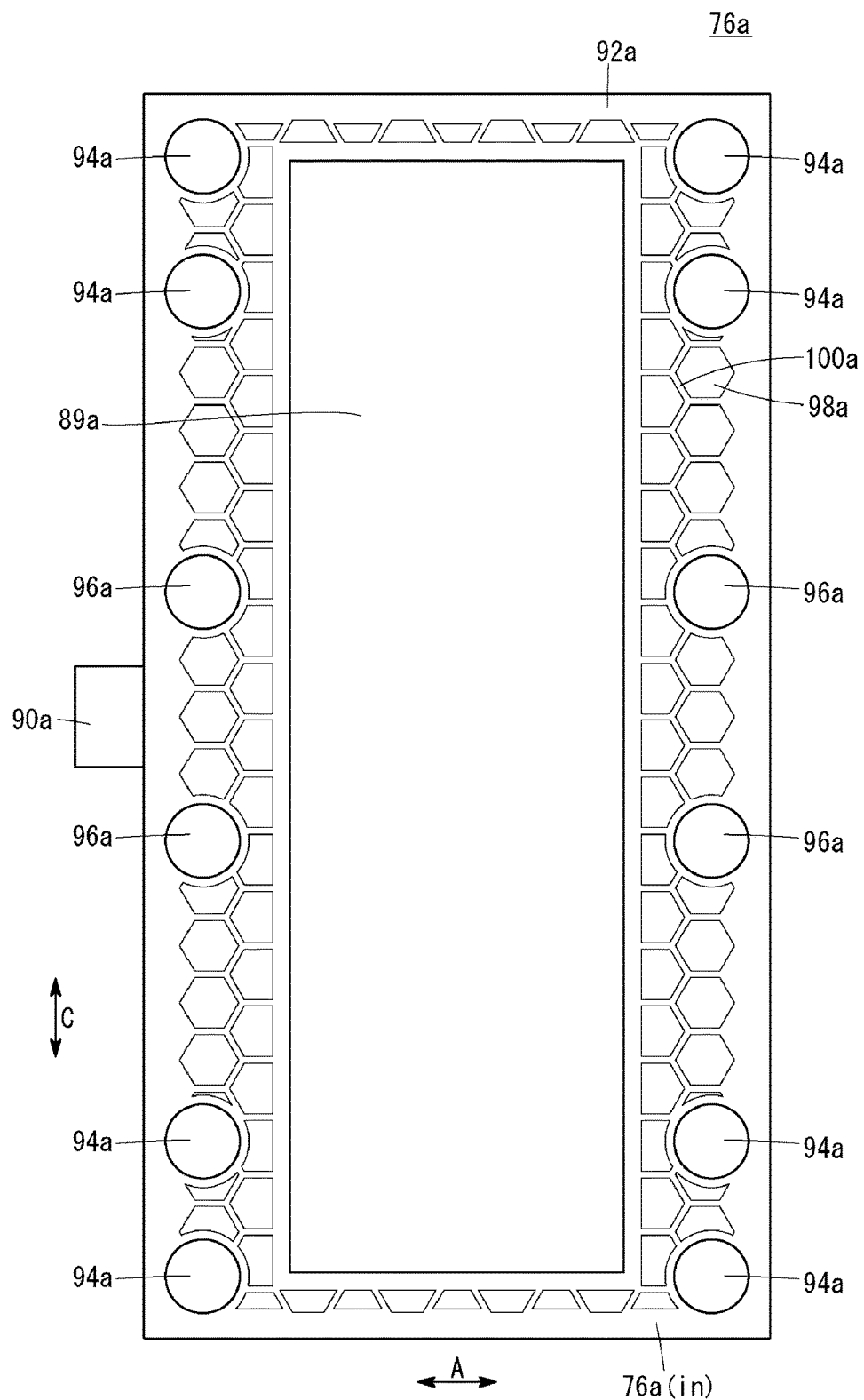
FIG. 7 is a plan view illustrating an inner surface of the manifold cover.

Referring to FIG. 7, a plurality of recessed portions 98a are formed, with ribs 100a therebetween, in an inner surface 76a(in) of the manifold cover 76a (facing the manifold base 74a) so as to surround the coolant passage 89a. As with the recessed portions 82a, the recessed portions 98a have a honeycomb shape. However, the recessed portions 98a may have, for example, polygonal shapes or circular shapes.

Referring to FIGS. 4 and 6, a plurality of recessed portions 98a are formed, with ribs 100a therebetween, in an outer surface 76a(out) of the manifold cover 76a so as to surround the outer periphery of the body 88a.

Referring to FIG. 4, for example, metal cylindrical collar members 106a are disposed in the holes 94a. The length of each of the cylindrical collar members 106a in the axial direction is set so that, when the cylindrical collar member 106a is inserted into the hole 94a and the hole 84a, an end of the cylindrical collar member 106a can be in contact with a plate surface of the second end plate 18b.

When fastening bolts 108a (hexagonal bolts) are inserted into the cylindrical collar members 106a and screwed into the tapped holes 77a, the coolant inlet manifold member 72a is fixed to the second end plate 18b.

Referring to FIG. 4, for example, metal cylindrical collar members 110a are disposed in the holes 96a. The length of each of the cylindrical collar members 110a in the axial direction is set so that, when the cylindrical collar member 110a is inserted into the hole 96a, an end of the cylindrical collar member 110a can be in contact with an end surface of the female-threaded member 86a in the manifold base 74a.

When fastening bolts 112a (hexagonal bolts) are inserted into the cylindrical collar members 110a and screwed into the female-threaded members 86a, the manifold cover 76a is fixed to the manifold base 74a.

Referring to FIG. 1, the coolant outlet manifold member 72b is fixed to the second end plate 18b. Elements of the coolant outlet manifold member 72b that are the same as those of the coolant inlet manifold member 72a will be denoted by the same numerals with "b" instead of "a", and detailed descriptions of such elements will be omitted.

Coolant outlets 78b (fluid manifolds), which are fluidly connected with the coolant discharge manifolds 50b, are formed in upper and lower parts of the coolant outlet manifold member 72b. In the coolant outlet manifold member 72b, an outlet pipe 90b, from which the coolant is discharged, is disposed at substantially the central part of a body 88b of a manifold cover 76b in the height direction so as to extend in a horizontal direction (or in a direction that is inclined with respect to the horizontal direction).

An operation of the fuel cell stack 10, which is structured as describe above, will be described.

Referring to FIG. 2, an oxidant gas, such as an oxygen-containing gas, is supplied from the oxidant gas inlet manifold member 68a on the first end plate 18a to the oxidant gas supply manifold 46a. A fuel gas, such as a hydrogen-containing gas, is supplied from the fuel gas inlet manifold member 70a on the first end plate 18a to the fuel gas supply manifold 48a.

Referring to FIG. 1, a coolant, such as pure water, ethylene glycol, or an oil, is supplied from the inlet pipe 90a of the coolant inlet manifold member 72a on the second end plate 18b into the coolant passage 89a of the body 88a. The coolant is supplied to each of the coolant supply manifolds 50a, which are connected to upper and lower parts of the coolant passage 89a.

Referring to FIG. 3, the oxidant gas flows from the oxidant gas supply manifold 46a into the oxidant gas channel 58 of the cathode separator 42. The oxidant gas flows along the oxidant gas channel 58 in the direction of arrow A, and is supplied to the cathode electrode 54 of the membrane electrode assembly 40.

The fuel gas is supplied from the fuel gas supply manifold 48a to the fuel gas channel 60 of the anode separator 44. The fuel gas flows along the fuel gas channel 60 in the direction of arrow A, and is supplied to the anode electrode 56 of the membrane electrode assembly 40.

In the membrane electrode assembly 40, the oxidant gas supplied to the cathode electrode 54 and the fuel gas supplied to the anode electrode 56 are consumed in electrochemical reactions in the electrode catalyst layers, and thereby electric power is generated.

The oxidant gas supplied to the cathode electrode 54 of the membrane electrode assembly 40 and partially consumed is discharged along the oxidant gas discharge manifold 46b in the direction of arrow B. The fuel gas supplied to the anode electrode 56 of the membrane electrode assembly 40 and partially consumed is discharged along the fuel gas discharge manifold 48b in the direction of arrow B.

The coolant supplied to the upper and lower coolant supply manifolds 50a flows into the coolant channel 62 between the cathode separator 42 and the anode separator 44 that are adjacent to each other. The coolant temporarily flows from the upper and lower coolant supply manifolds 50a so as to become closer to each other, that is, in the directions of arrow C, and cools the membrane electrode assembly 40 while flowing in the direction of arrow A. The coolant flows outward in the direction of arrow C so as to become separated from each other (directions away from each other), and is discharged along the upper and lower coolant discharge manifolds 50b in the direction of arrow B.

Referring to FIG. 1, the coolant flows from the upper and lower coolant discharge manifolds 50b and is discharged to a coolant passage 89b in the body 88b of the coolant outlet manifold member 72b. The coolant flows toward the center of the body 88b and is discharged from the outlet pipe 90b to the outside.

In the present embodiment, referring to FIGS. 1 and 5, the plurality of recessed portions 82a are formed, with the ribs 83a therebetween, in the surface 74a(out) of the manifold base 74a so as to be located in the region between the pair of coolant inlets 78a.

Due to the presence of the recessed portions 82a, the thickness of the manifold base 74a can be reduced, and the weight of the manifold base 74a can be reliably reduced. In addition, the ribs 83a are disposed between the recessed portions 82a. Accordingly, the ribs 83a function as reinforcement, and the manifold base 74a can have sufficient strength.

In addition, the height of the ribs 83a is smaller than that of the surface 74a(out) of the manifold base 74a, and a space is formed between the ribs 83a and the surface of the second end plate 18b. Thus, an air space is formed between the second end plate 18b and the ribs 83a, so that dissipation of heat from the second end plate 18b can be suppressed. Moreover, because the height of the ribs 83a is smaller than that of the outer peripheral surface of the manifold base 74a, only the outer peripheral surface need to have sufficient flatness. Therefore, precision control is facilitated.

Furthermore, referring to FIG. 4, the plurality of recessed portions 85a are formed, with the ribs 87a therebetween, in regions of the surface 74a(in) of the manifold base 74a around the coolant inlets 78a. Thus, an advantage is obtained in that the weight of the manifold base 74a can be further reduced.

Referring to FIG. 7, the plurality of recessed portions 98a are formed, with the ribs 100a therebetween, in the surface 76a(in) of the manifold cover 76a so as to surround the coolant passage 89a. Due to the presence of the recessed portion 98a, the thickness of the manifold cover 76a can be reduced, and the weight of the manifold cover 76a can be reliably reduced. In addition, the ribs 100a are disposed between the recessed portions 98a. Accordingly, the ribs 100a function as reinforcement, and the manifold cover 76a can have sufficient strength.

Moreover, referring to FIG. 6, the plurality of recessed portions 98a are formed, with the ribs 100a therebetween, in the outer surface 76a(out) of the manifold cover 76a so as to surround the outer periphery of the body 88a. Thus, the weight of the manifold base 74a can be further reduced, and the weight of the entirety of the coolant inlet manifold member 72a can be reduced while maintaining sufficient strength. The coolant outlet manifold member 72b provides the same advantages as the coolant inlet manifold member 72a.

In the present embodiment, the coolant inlet manifold member 72a is constituted by the manifold base 74a and the manifold cover 76a, which are independent from each other. However, this is not restricted. For example, the coolant inlet manifold member 72a may be a unit component that is made by integrally forming the manifold base 74a and the manifold cover 76a with each other. The coolant outlet manifold member 72b may also be a unit component.

According to the present disclosure, a fuel cell stack includes a stack of power generation cells that are stacked, each of the power generation cells including a membrane electrode assembly in which electrodes are disposed on both sides of an electrolyte membrane, and a separator stacked on the membrane electrode assembly; end plates disposed at both ends of the stack of the power generation cells in a stacking direction; and a resin fluid manifold member that is disposed on one of the end plates and through which a fluid flows, the fluid being a coolant, a fuel gas, or an oxidant gas.

In the fuel cell stack, a plurality of recessed portions are formed, with ribs therebetween, in a contact surface of the resin fluid manifold member, the contact surface being in contact with the one of the end plates.

In the fuel cell stack, preferably, the resin fluid manifold member includes a manifold base that is in contact with the one of the end plates, and a manifold cover that is fixed to the manifold base so as to overlap the manifold base. In this case, preferably, the plurality of recessed portions are formed, with the ribs therebetween, in a contact surface of the manifold base, the contact surface being in contact with the one of the end plates.

In the fuel cell stack, preferably, fluid manifolds are formed in both end portions of the manifold base, each of the fluid manifolds allowing the fluid to flow through in the stacking direction. In this case, preferably, the plurality of recessed portions are formed, with the ribs therebetween, so as to be located in a region between the fluid manifolds.

With the present disclosure, the recessed portions are formed, with the ribs therebetween, in the contact surface of the resin fluid manifold member. Due to the presence of the recessed portions, the thickness of the resin fluid manifold member can be reduced, and the weight of the resin fluid manifold member can be reliably reduced. In addition, the ribs are disposed between the recessed portions. Accordingly, the ribs function as reinforcement, and the resin fluid manifold member can have sufficient strength.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a stack of power generation cells that are stacked, each of the power generation cells including
a membrane electrode assembly in which electrodes are disposed on both sides of an electrolyte membrane, and
a separator stacked on the membrane electrode assembly;
end plates disposed at both ends of the stack of the power generation cells in a stacking direction; and
a resin fluid manifold member that is disposed on one of the end plates and through which a fluid flows, the fluid being a coolant, a fuel gas, or an oxidant gas,
wherein a plurality of recessed portions are formed, with ribs therebetween, in a contact surface of the resin fluid manifold member, the contact surface being in contact with the one of the end plates,
wherein the ribs have a height that does not extend to a height of the contact surface such that the ribs are spaced apart from the one of the end plates when the resin fluid manifold member is disposed on the one of the end plates.

2. The fuel cell stack according to claim 1,
wherein the resin fluid manifold member includes
a manifold base that is in contact with the one of the end plates, and
a manifold cover that is fixed to the manifold base so as to overlap the manifold base, and
wherein the plurality of recessed portions are formed, with the ribs therebetween, in a contact surface of the manifold base, the contact surface being in contact with the one of the end plates.

3. The fuel cell stack according to claim 2,
wherein fluid manifolds are formed in both end portions of the manifold base, each of the fluid manifolds allowing the fluid to flow therethrough in the stacking direction, and
wherein the plurality of recessed portions are formed, with the ribs therebetween, so as to be located in a region between the fluid manifolds.

4. A fuel cell stack comprising:
power generation cells stacked in a stacking direction, each of the power generation cells comprising:
a membrane electrode assembly comprising:
an electrolyte membrane; and
electrodes between which the electrolyte membrane is sandwiched in the stacking direction; and
a separator stacked on the membrane electrode assembly in the stacking direction;
end plates between which the power generation cells are sandwiched in the stacking direction; and
a resin fluid manifold member which is disposed on one of the end plates opposite to the power generation cells in the stacking direction and through which a fluid is to flow, the resin fluid manifold member having a contact surface which is in contact with the one of the end plates, the resin fluid manifold member comprising:
recessed portions provided in the contact surface; and
ribs provided between the recessed portions in the contact surface,
wherein the ribs have a height that does not extend to a height of the contact surface such that the ribs are spaced apart from the one of the end plates when the resin fluid manifold member is disposed on the one of the end plates.

5. The fuel cell stack according to claim 4,
wherein the resin fluid manifold member includes
a manifold base having the contact surface which is in contact with the one of the end plates, and a manifold cover attached to the manifold base to overlap the manifold base, and wherein the manifold base comprises the recessed portions and the ribs in the contact surface.

6. The fuel cell stack according to claim 5, wherein the manifold base comprises
- a first fluid manifold through which the fluid is to flow in the stacking direction, and
- a second fluid manifold which is opposite to the first fluid manifold with respect to the recessed portions and the ribs and through which the fluid is to flow in the stacking direction.

7. The fuel cell stack according to claim 4, wherein the fluid is a coolant, a fuel gas, or an oxidant gas.

8. The fuel cell stack according to claim 1, wherein the plurality of recessed portions are recessed from the contact surface in a direction away from the one of the end plates.

9. The fuel cell stack according to claim 1, wherein the ribs overlap with a portion of a surface of the one of the end plates in the stacking direction.

10. The fuel cell stack according to claim 4, wherein the recessed portions are recessed from the contact surface in a direction away from the one of the end plates.

11. The fuel cell stack according to claim 4, wherein the ribs overlap with a portion of a surface of the one of the end plates in the stacking direction.

* * * * *